Sept. 23, 1952      L. E. KEENE      2,611,231
BALL BEARING TEXTILE SPINDLE
Filed June 10, 1949
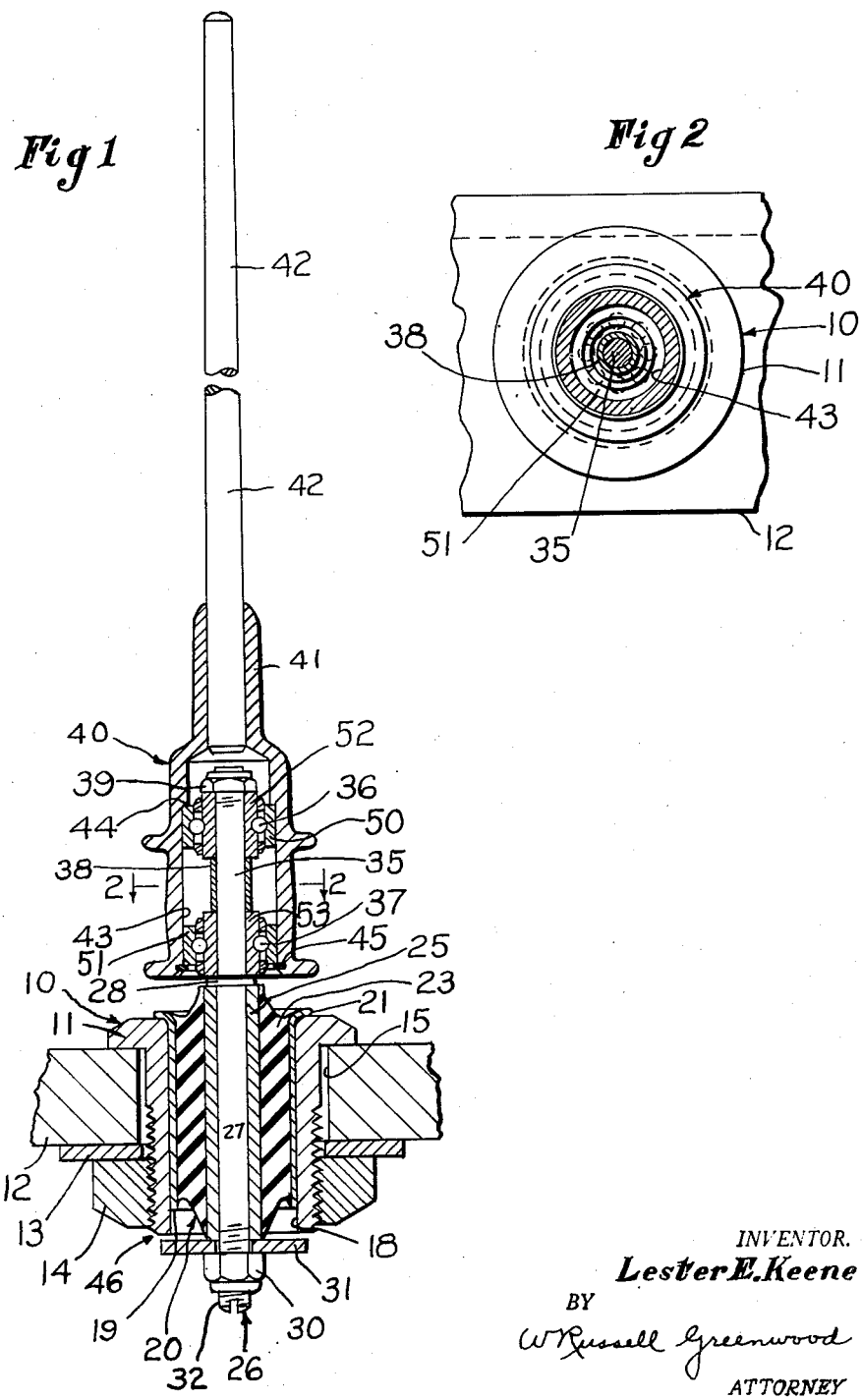
INVENTOR.
*Lester E. Keene*
BY
*W Russell Greenwood*
ATTORNEY Patented Sept. 23, 1952

2,611,231

UNITED STATES PATENT OFFICE 2,611,231

BALL BEARING TEXTILE SPINDLE

Lester E. Keene, Newtonville, Mass., assignor, by mesne assignments, to Whitin Machine Works, a corporation of Massachusetts Application June 10, 1949, Serial No. 98,237

1 Claim. (Cl. 57—130)

This application is a continuation in part of the joint co-pending application Serial No. 6,944, filed February 7, 1948, for Textile Spindle, now Patent No. 2,479,168, granted August 16, 1949, of which I am one of the co-inventors.

This present invention relates to ball bearing spinning and twisting spindles and is more especially concerned with the ball bearing mountings for supporting the whorl with its attached blade for rotation upon a "dead spindle" or stationary support.

One object of the invention is to provide an improved bearing mounting for the rotatable whorl and its attached blade which will dispense with the capillary lubrication systems and the oil circulating bearing lubrication arrangements which previously characterized and were a necessary part of the structure of spindles of this class for maintaining a continuous supply of lubricant to the spaced bearings from a lubricant supply reservoir.

Another object of the invention is to effect economies in the manufacture, maintenance and use of spindles of this class.

According to the invention, the improved ball bearing mounting arrangement comprises two self-sealed grease lubricated axially spaced ball bearing units housed entirely within the recessed bottom of the revolving whorl between the depending skirt portion of the whorl and a central stationary post or "dead" spindle for rotatably supporting the whorl thereon. This type of ball bearing is a well known and widely accepted commercial article of manufacture with seals permanently built in and fully enclosed and sealed with a lubricant. For the great majority of installations these self-sealed bearings do not require lubrication attention throughout their life. In other instances, under average service conditions, the bearings will operate for a number of years and give a very long period of service without relubrication. Provision is made for relubrication, if required, by a simple injection system which does not require any disassembly of the bearing parts.

By way of example, a spinning spindle embodying the bearing mounting according to the invention now will be described in detail with reference to the accompanying drawing in which:

Fig. 1 is a part sectional elevation of the spindle, and

Fig. 2 is a transverse sectional view taken substantially on the line 2—2 of Fig. 1.

Referring to the drawings, the spinning spindle there shown comprises a relatively short base member 10 in the form of a flanged tubular collar having an enlarged circular flange 11 at its upper end. The base 10 is adapted to be clamped to the usual spindle rail 12 of the spinning frame by means of a washer 13 and a clamp nut 14 threaded directly upon the externally threaded lower end portion of the base member 10. The cylindrical body portion of the base member 10 extends loosely through the usual circular aperture 15 in the rail 12 and is made sufficiently smaller in diameter than the aperture 15 to provide sufficient clearance for performing the conventional centering adjustment and the plumbing operation of the base member on the rail.

The base member 10 has a central cylindrical bore 18 therethrough into which is pressed the outer metallic shell 19 of the tube-form resilient mounting unit 20. The upper end of the mounting unit 20 is provided with an enlarged flange 21 which engages the upper end face of the flange 11. A resilient rubber member 23 of annular form extends from the outer shell 19 to an inner metallic shell or central sleeve 25. An upstanding stationary central post or arbor 26 has a lower portion 27 adapted to extend through and fit snugly into the central bore of the inner metallic shell 25 of the resilient mounting unit 20. The rubber member 23 is secured to the metallic shell members 19 and 25 respectively through a surface and radial tension-resisting union therewith. This rubber preferably is bonded by a vulcanized union with the inner and outer shells 19 and 25, and is placed under initial tension. This may be accomplished by vulcanizing the rubber in place and putting the rubber under initial tension as the rubber shrinks as it cools in vulcanization, in accordance with the disclosure of the Lord Patent No. 1,452,693, granted April 24, 1923. Thus, the normal load of the spindle structure will be held by the rubber under tension and may be made as yielding or as soft as may be desired, that is to say, the rubber may be increased in length increasing the rate of increase of resistance to movement, or it may be made shorter, thus reducing the rate of increase of resistance and the same effects may be accomplished by increasing the diameter of the outer shell 19 and the radial dimensions of the rubber wall of the member 23.

The central post 26 extends entirely through the inner shell 25 and has a shoulder or collar 28 arranged at an intermediate portion. The shoulder 28 is held clamped against the upper end of the inner shell 25 by means of an "elastic" stop nut 30 and a washer 31 which, in turn, is clamped against the lower end of the inner shell 25 upon tightening of the nut 30 on the screw threaded end extension 32 of the central post 26.

The central post 26 has integral therewith an upper cylindrical stem portion 35 above the shoulder 28, and mounted upon this stem portion are a pair of ball bearing units 36 and 37, preferably of the double seal type. A spacer 38 is arranged on the stem 26 between the ball bearing units 36 and 37 and the assembly is held clamped together by a nut 39 which has threaded engagement with the threaded upper end portion of the stem 35.

In one practical embodiment of the above described spindle construction the ball bearing units 36 and 37 used and found to prove well adapted and satisfactory were two double seal commercial ball bearings of the type known as New Departure N-D-Seal Bearings Series #88036, the data necessary for the selection and application of which including the principal dimensions appearing at page 71 of the New Departure Handbook, vol. 1, 18th edition, 1946, published by New Departure Division, General Motors Corporation, Bristol, Connecticut.

In another practical embodiment of the above described spindle construction the ball bearing units 36 and 37 employed were of the commercial type known in the trade as Fafnir Mechani-Seal, LL type (Double Seal) Bearings, Bearing No. 36LL, the principal dimensions of which are listed at page 37 of section III of Catalog No. 35, Fifth edition, second printing, 1947, published by The Fafnir Bearing Company, New Britain, Connecticut.

A whorl 40 having the usual acorn 41 with the spindle blade 42 fast therein is recessed axially at its under side, as at 43, to provide a depending annular belt-engaging skirt portion which extends down over and encompasses the stem 35 whereby both ball bearing units 36 and 37 are entirely housed within the interior of the whorl. The lower end of the recess 43 is counterbored to provide the inner annular shoulder 44. The outer race ring 50 of the upper ball bearing 36 has its top end face in firm abutting engagement against the shoulder 44 while a spring lock ring 45 beneath and bearing against the bottom end face of the outer race ring 51 of the lower ball bearing unit 37 secures the ring 51 fast with the whorl. The inner and outer race members 52, 53 and 50 and 51 respectively of the respective ball bearing units 36 and 37 preferably are secured by a light press-fit to the whorl and the stem respectively. The whorl 40 and the blade member 42 thus are arranged for free rotation upon the central post 26.

If desired, injection-lubricated type ball bearing units may be utilized in lieu of the double seal type ball bearing units 36 and 37 illustrated in the drawings by appropriate modification of the whorl to provide suitable ports opposite the usual injector holes in the outer metal of the seal for insertion of a hollow needle, for injection of a small quantity of lubricant, such as low shear grease into the upper bearing 36. Relubrication of the lower bearing 37 may be accomplished by insertion of the needle through the small injector holes in the bottom seal member.

The washer 31 is installed as shown and has the portion bounding its central hole in contact with the lower end of the inner shell 25. Suitable clearance is provided between the lower end of the base 10 and the outer marginal portion of the washer 31, as indicated at 46, to enable limited movement of the central post 26 under ordinary overload or shock for safety purposes.

The nuts 30 and 39 preferably are of the type known as "Elastic Stop Nuts" incorporating a locking collar of vulcanized fiber and of the general structure made by the Elastic Stop Nut Corporation of America, Union, New Jersey.

From the foregoing description, it will be seen that the rubber mounting unit 20 is so constructed and arranged as to respond to the radial, torsional and axial thrusts on the arbor through a shear stress or distortion of the rubber and resist oscillatory and/or gyratory movements of the arbor and the load during the running of the spindle.

The resilient mounting unit 20 preferably is of the rubber bonded, shear type, tube-form mounting, double extension construction, manufactured by the Lord Manufacturing Company of Erie, Pennsylvania, and of the general construction disclosed in H. C. Lord Patents Nos. 1,452,693, 1,778,197 and 1,778,503.

What is claimed is:

A textile spindle comprising a base member adapted to be secured to the frame of a spinning or twisting machine, a central post carried by said base member and presenting an upright cylindrical stem portion, a whorl, a blade fast with said whorl, said whorl being recessed axially at its underside with a depending annular belt-engaging skirt portion which extends down over and encompasses said stem, said post and its stem being in axial alignment with said blade and constituting a normally stationary support for said whorl and its blade during their rotation by a belt, the interior of said recess presenting an inner annular shoulder, a pair of self-sealed lubricated ball bearing units spaced widely apart on said stem and housed entirely within the axial recess of said whorl skirt portion, said ball bearing units supporting said whorl and its blade for free rotation upon said stem, each of said ball bearing units having its inner and outer race ring members secured by a light press fit to the whorl and the stem respectively, the upper ball bearing unit having the top end face of its outer race ring member in firm abutting engagement against the annular shoulder within the whorl recess, a spacer on said stem interposed between and in engagement with the inner race ring members of both ball bearing units, and a resilient metal ring member beneath and bearing against the bottom end face of the outer race ring member of the lower ball bearing unit securing said last-named race ring member fast with the whorl.

LESTER E. KEENE.

REFERENCES CITED

The following references are of record in the file of this patent:

UNITED STATES PATENTS

| Number | Name | Date |
| --- | --- | --- |
| 654,892 | Ham | July 31, 1900 |
| 1,452,180 | Brunner | Apr. 17, 1923 |
| 1,474,490 | Perkins | Nov. 20, 1923 |
| 1,507,137 | Perkins | Sept. 2, 1924 |
| 1,515,161 | Mueller | Nov. 11, 1924 |
| 2,479,168 | Keene et al. | Aug. 16, 1949 |
| 2,492,091 | Berg | Dec. 20, 1949 |